(12) United States Patent
Lu et al.

(10) Patent No.: US 9,317,590 B2
(45) Date of Patent: Apr. 19, 2016

(54) SEARCH METHOD, SEARCH DEVICE AND STORAGE MEDIUM

(71) Applicant: TENCENT TECHNOLOGY (SHENZHEN) COMPANY LIMITED, Shenzhen (CN)

(72) Inventors: Yanxiong Lu, Shenzhen (CN); Yuekui Yang, Shenzhen (CN); Liang Wang, Shenzhen (CN); Feng Jiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 14/347,776

(22) PCT Filed: Dec. 6, 2012

(86) PCT No.: PCT/CN2012/086025
§ 371 (c)(1),
(2) Date: Mar. 27, 2014

(87) PCT Pub. No.: WO2013/120373
PCT Pub. Date: Aug. 22, 2013

(65) Prior Publication Data
US 2014/0358914 A1    Dec. 4, 2014

(30) Foreign Application Priority Data
Feb. 13, 2012   (CN) .......................... 2012 1 0031523

(51) Int. Cl.
G06F 17/30    (2006.01)
(52) U.S. Cl.
CPC .... *G06F 17/30684* (2013.01); *G06F 17/30011* (2013.01); *G06F 17/30696* (2013.01); *G06F 17/30731* (2013.01)

(58) Field of Classification Search
CPC combination set(s) only.
See application file for complete search history.

(56) References Cited

U.S. PATENT DOCUMENTS

| 2011/0087701 A1 | 4/2011 | Eyres et al. |
| 2015/0286708 A1* | 10/2015 | Tao ................... G06F 17/30864 707/730 |

FOREIGN PATENT DOCUMENTS

CN        1741012        3/2006

OTHER PUBLICATIONS

International Preliminary Report on Patentability for PCT/CN2012/086025, Feb. 28, 2013, 10 pages.
English Abstract of CN 1741012, 1 page.
Castells, P. An Adaption of the Vector-Space Model for Ontology-Based Information Retrieval, IEEE Transactions on Knowledge and Data Engineering, 2007, pp. 261-272.

* cited by examiner

*Primary Examiner* — Etienne Leroux
(74) *Attorney, Agent, or Firm* — Peter Su; Dentons US LLP

(57) ABSTRACT

Disclosed are a search method, a search device and a storage medium. The method comprises obtaining all relevant documents of information to be sought; calculating a relevancy between each relevant document and the information to be sought based on a word matching algorithm and a semantics matching algorithm; performing sequencing processing on all the relevant documents according to the relevancy obtained through calculation, and displaying a sequencing result. Further disclosed is a search device. The present invention comprehensively considers matching between words, and matching of the semantics relationship between words, obtains an accurate relevancy calculation result, provides an ideal search result to a user, and improves satisfaction of the user.

7 Claims, 4 Drawing Sheets

| vector (word) | weight (IDF value) |
|---|---|
| XX brand | 8.435292 |
| phone | 5.256969 |
| cost performance ratio | 8.952069 |
| …… | …… |

| vector(word) | vector(word) | mutual information |
|---|---|---|
| XX brand | cost performance ratio | 5.809715 |
| software | phone | 0 |
| cost performance ratio | very | 0 |
| phone | cost performance ratio | 2.053217 |
| …… | …… | …… |

SEARCH METHOD, SEARCH DEVICE AND STORAGE MEDIUM

CROSS-REFERENCE TO RELATED APPLICATIONS

This application is a national phase application based on the international application number PCT/CN2012/086025, filed on Dec. 6, 2012, and claims the priority of Chinese patent application No. CN 201210031523.3 entitled "SEARCH METHOD, SEARCH DEVICE AND STORAGE MEDIUM" filed to the State Intellectual Property Office of China on Feb. 13, 2012, the contents of both of which are incorporated by reference herein in their entireties.

TECHNICAL FIELD

The present disclosure relates to the field of computer network search technology, and particularly to a search method, device, and storage medium.

BACKGROUND

Currently, traditional search schemes are mainly as follows. All relevant documents are searched in the network according to the information to be searched, which is input by a user. The relevancy degree of each relevant document to the information to be searched is calculated based on a certain algorithm rule. All the relevant documents are sorted based on the value of the relevancy degree, and the sorting result is returned to the user as a search result. It can be seen from the above that the value of the relevancy degree, which is generally reflected by a correlation score intuitionally, affects the sorting result of the relevant documents directly, and affects the search result of the user directly.

In the traditional search schemes, normally, the correlation is calculated through a word matching algorithm. For example, the correlation is scored by an algorithm such as the BM25 (Best Match) algorithm, the proximity (term proximity scoring) algorithm, or the like. The larger the correlation score, the higher the relevancy degree. A description is made as follows, taking a search scheme based on the BM25 algorithm as an example. Assume that the information to be searched, which is input by the user, is "capital of China". According to the correlation score rule of the BM25 algorithm, a relevant document can have a corresponding correlation score only when the words "China" and "capital" appear in the relevant document. Otherwise, the correlation score of the relevant document is 0. For example, one of the relevant documents contains "Beijing, which is a famous historical and cultural city with a city history of more than 3,000 years and a history of more than 850 years as the capital, is the political and cultural center of the country, and is also the biggest land and air production/transportation hub in the country". According to the above traditional search schemes, the correlation score of the relevant document is 0, indicating that it is irrelevant to the information to be searched. However, from the viewpoint of semantic relationship, the correlation between the relevant document and the information to be searched is very high. After the sorting process, the relevant document may be ordered in a previous search result page, which is disadvantageous for the user to check. It can be known from the above example that the traditional search scheme performs correlation matching based only on them, and does not consider the semantic relationship between words, which may result in an inaccurate calculation result of the correlation, thereby affecting the order of the search result, decreasing the satisfaction of the user with the search result and deteriorating the user's search experience.

SUMMARY

A technical problem to be solved by the embodiments of the present disclosure is to provide a search method, device, and storage medium capable of obtaining a more accurate search result.

In an aspect, there is provided in an embodiment of the present disclosure a search method, comprising obtaining relevant documents of information to be searched; calculating a correlation between each obtained relevant document and the information to be searched, based on a word matching algorithm and a semantic matching algorithm; and sorting the obtained relevant documents according to the calculated correlation, and displaying a sorting result. Said calculating a correlation between each obtained relevant document and the information to be searched based on a word matching algorithm and a semantic matching algorithm comprises: vectorizing the information to be searched, to obtain m vectors $t_i$, wherein m and i are both positive integers, and $1 \le i \le m$; vectorizing each obtained relevant document, to obtain n vectors $d_j$ corresponding to each relevant document, wherein n and j are both positive integers, and $1 \le j \le n$; calculating a relevancy score $S_1$ of each relevant document to the information to be searched based on the word matching algorithm, and calculating a relevancy score $S_2$ of each relevant document to the information to be searched based on the semantic matching algorithm; calculating the correlation S between each relevant document and the information to be searched, according to the formula of $S = \alpha \times S_1 + (1-\alpha) \times S_2$, wherein $\alpha$ is a preset weight, and $0 < \alpha < 1$. The formula of the word matching algorithm is as follows:

$$S_1 = \sum_{i=1}^{m} \left( \frac{qtf_i}{k_3 + qtf_i} \right) \times \left( \frac{(k_1 + 1) \times tf_i}{k \times \left(1 - b + b\frac{l}{avdl}\right) + tf_i} \right) \log(w_i)$$

wherein $k_1$, $k_3$, k and b are constants, $qtf_i$ is the word frequency of the $i^{th}$ vector $t_i$ in the information to be searched, $tf_i$ is the word frequency of the vector $t_i$ in a corresponding relevant document, l is the length of the corresponding relevant document, avdl is the average length of all obtained relevant documents, and $w_i$ is the weight of the vector $t_i$.

In another aspect, there is provided in an embodiment of the present disclosure a search method, comprising: obtaining relevant documents of information to be searched; calculating a correlation between each obtained relevant document and the information to be searched, based on a word matching algorithm and a semantic matching algorithm; and sorting the obtained relevant documents according to the calculated correlation, and displaying a sorting result. Said calculating a correlation between each obtained relevant document and the information to be searched based on a word matching algorithm and a semantic matching algorithm comprises: vectorizing the information to be searched, to obtain m vectors $t_i$, wherein m and i are both positive integers, and $1 \le i \le m$; vectorizing each obtained relevant document, to obtain n vectors $d_j$ corresponding to each relevant document, wherein n and j are both positive integers, and $1 \le j \le n$; calculating a relevancy score $S_1$ of each relevant document to the information to be searched based on the word matching algorithm, and calculating a relevancy score $S_2$ of each relevant document to the information to be searched based on the semantic matching algorithm; calculating the correlation S between each relevant document and the information to be searched, according to the formula of $S=\alpha \times S_1+(1-\alpha) \times S_2$, wherein $\alpha$ is a preset weight, and $0<\alpha<1$. The formula of the semantic matching algorithm is as follows:

$$S_2 = \sum_{i=1}^{m} \sum_{j}^{n} \frac{1}{k_3+1} \times \left(\frac{k_1+1}{k \times \left(1-b+b\frac{l}{avdl}\right)}\right) mi(t_i, d_j)$$

wherein $k_1$, $k_3$, $k$ and $b$ are constants, $l$ is the length of a corresponding relevant document, avdl is the average length of all the obtained relevant documents, and $mi(t_i,d_j)$ is the mutual information between the vector $t_i$ and the vector $d_j$.

In another aspect, there is provided in an embodiment of the present disclosure a search device, comprising: a search module which is configured to obtain relevant documents of information to be searched; a calculation module which is configured to calculate a correlation between each relevant document obtained by the search module and the information to be searched, based on a word matching algorithm and a semantic matching algorithm; a sort module which is configured to sort all the relevant documents obtained by the search module according to the correlation calculated by the calculation module; and a display module which is configured to display a sorting result obtained by the sort module. The calculation module comprises: a first vectorization unit which is configured to vectorize the information to be searched, to obtain m vectors $t_i$, wherein m and i are both positive integers, and $1 \le i \le m$; a second vectorization unit which is configured to vectorize each relevant document obtained by the search module, to obtain n vectors $d_j$ corresponding to each relevant document, wherein n and j are both positive integers, and $1 \le j \le n$; a word matching calculation unit which is configured to calculate a relevancy score $S_1$ of the relevant document processed by the second vectorization unit to the information to be searched based on the word matching algorithm; a semantic matching calculation unit which is configured to calculate a relevancy score $S_2$ of the relevant document processed by the second vectorization unit to the information to be searched based on the semantic matching algorithm; and a correlation calculation unit which is configured to calculate the correlation S between the relevant document and the information to be searched, according to the formula of $S=\alpha \times S_1+(1-\alpha) \times S_2$, wherein $\alpha$ is a preset weight, and $0<\alpha<1$. The formula of the word matching algorithm is:

$$S_1 = \sum_{i=1}^{m} \left(\frac{qtf_i}{k_3+qtf_i}\right) \times \left(\frac{(k_1+1) \times tf_i}{k \times \left(1-b+b\frac{l}{avdl}\right)+tf_i}\right) \log(w_i)$$

The formula of the semantic matching algorithm is as follows:

$$S_2 = \sum_{i=1}^{m} \sum_{j}^{n} \frac{1}{k_3+1} \times \left(\frac{k_1+1}{k \times \left(1-b+b\frac{l}{avdl}\right)}\right) mi(t_i, d_j)$$

wherein $k_1$, $k_3$, $k$ and $b$ are constants, $qtf_i$ is the word frequency of the $i^{th}$ vector $t_i$ in the information to be searched, $tf_i$ is the word frequency of the vector $t_i$ in a corresponding relevant document, $l$ is the length of the corresponding relevant document, avdl is the average length of all relevant documents obtained by the search module, $w_i$ is the weight of the vector $t_i$, and $mi(t_i,d_j)$ is the mutual information between the vector $t_i$ and the vector $d_j$.

In a further aspect, a storage medium having embodied thereon computer executable instructions for performing the search method in the aspects as described above.

With the implementation of the embodiments of the present disclosure, the following advantageous effects may be obtained.

The embodiments of the present disclosure combine the word matching algorithm and the semantic matching algorithm with each other, considering both the matching between words and the matching of the semantic relationship between words comprehensively, obtain a relatively accurate correlation between each relevant document and the information to be searched, sort based on the correlation and display the sorting result. The user may be provided with an ideal search result by obtaining the relevant document with a higher correlation quickly from the displayed search result, thereby meeting the user's practical search requirement, improving the search efficiency and the user's satisfaction.

BRIEF DESCRIPTION OF THE DRAWINGS

In order to explain technical solutions in embodiments of the present disclosure or in the prior art more clearly, a simple introduction to the attached drawings to be used in the description of embodiments or the prior art will be given below. Apparently, the attached drawings in the description below are only some embodiments of the present disclosure. For those ordinary skilled in the art, other attached drawings can be obtained according to these attached drawings without inventive efforts.

DETAILED DESCRIPTION

The technical solutions of the embodiments of the present disclosure will be described clearly and thoroughly in conjunction with attached drawings in the embodiments of the present disclosure hereinafter. Apparently, the described embodiments are only a part of, but not all, embodiments of the present disclosure. All other embodiments obtained by those ordinary skilled in the art based on the embodiments of the present disclosure without inventive efforts shall fall within the protection scope of the present disclosure.

In the solutions provided in the embodiments of the present disclosure, the search device may calculate the correlations between all relevant documents and the information to be searched based on a word matching algorithm and a semantic matching algorithm between words, and sort and display based on the correlation, so that the user may obtain the relevant document with a higher correlation quickly from the displayed search result, thereby meeting the user's search requirement and improving the search efficiency.

The information to be searched may be a search keyword or key-sentence input by the user, which may be represented by "query". The relevant document may be a document included in a search result obtained by the prior network search technology based on the search keyword or key-sentence input by the user, which may be represented by "document".

The word matching algorithm refers to a word-based matching in the search process, which may be an algorithm such as the BM25 algorithm, the proximity algorithm, or the like. In the embodiments of the present disclosure, descriptions will be made taking the BM25 algorithm as an example, unless otherwise specified. The semantic matching algorithm refers to a matching based on a semantic relationship between words in the search process. That is, the matching is based on mutual information between words in the search process. The so-called MI (Mutual Information) is a description of a relevancy degree between two random variables. In the text processing, MI is used to evaluate the correlation between two words. The larger the MI between two words is, the higher the relevancy degree between them.

Hereinafter, the search method provided in the embodiment of the present disclosure will be described in detail with reference to FIGS. 1-5.

Figure 1:
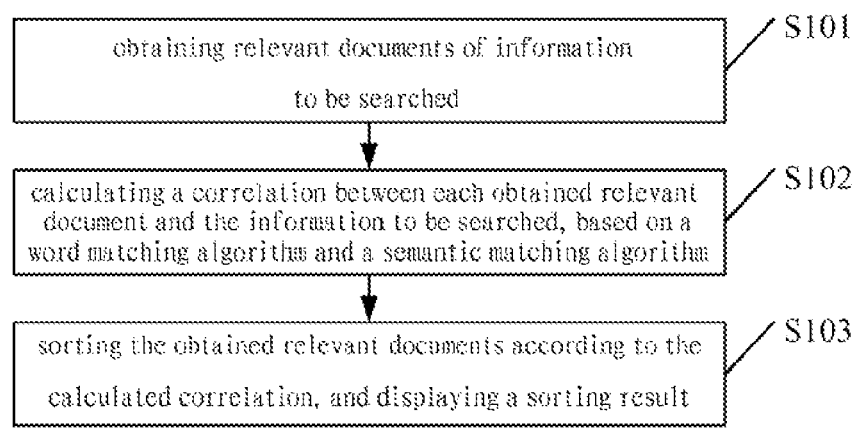
FIG. 1 is a flowchart of a search method provided in an embodiment of the present disclosure.

Refer to FIG. 1, which is a flowchart of a search method provided in an embodiment of the present disclosure. The method includes the following steps.

At Step S101, relevant documents of information to be searched are obtained. For example, all relevant documents are searched in network by the prior network search technology according to the information to be searched which is input by a user, and so on.

At Step S102, a correlation between each obtained relevant document and the information to be searched is calculated, based on a word matching algorithm and a semantic matching algorithm.

In this step, the score of the correlation between each obtained relevant document and the information to be searched may be formed of two parts, one of which is a relevancy score obtained based on the word matching algorithm, and the other of which is a relevancy score obtained based on the semantic matching algorithm. In practical applications, the weights of the two parts of relevancy scores may be set in advance depending on the situation, so that the correlation score formed of the weighted two parts of relevancy scores may reflect the relevancy degree of the relevant document to the information to be searched more accurately.

At Step S103, the obtained relevant documents are sorted according to the calculated correlation, and a sorting result is displayed.

In this step, all the searched relevant documents may be sorted and displayed in descending order of the correlation score between each obtained relevant document and the information to be searched, so that the document displayed first is always a relevant document most relevant to the information to be searched. Thereby, the user may obtain the relevant document with a higher correlation quickly from the displayed search result, thus meeting the user's search requirement and improving the search efficiency. It can be understood that, in this step, the sorting process may be carried out in other orders, for example, in an ascending order of the correlation score. Alternatively, it may be set that some of the documents are in ascending order of the correlation score, and some are in descending order of the correlation score, and so on.

Figures 2, 3:
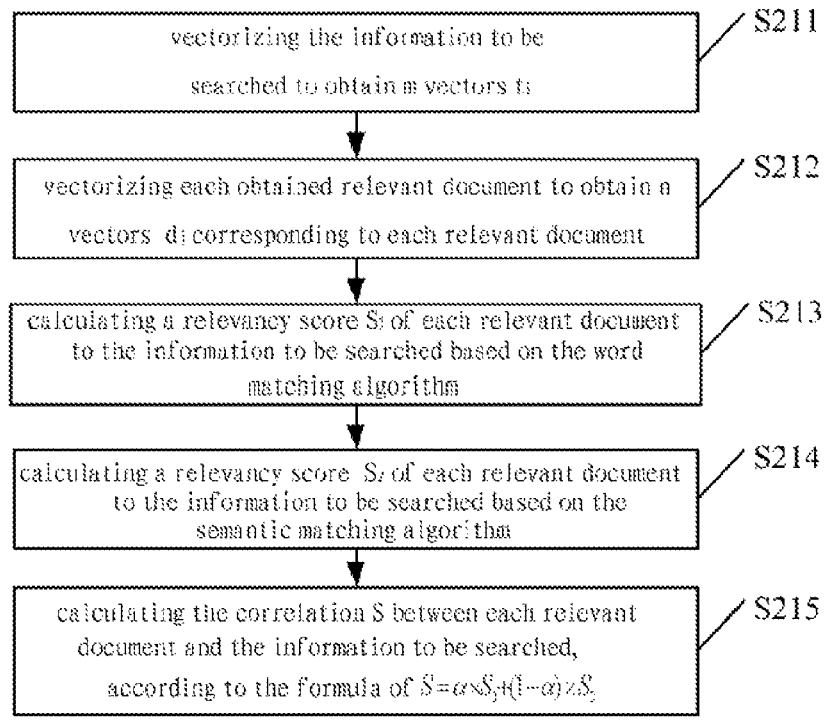
FIG. 2 is a detailed flowchart of Step S102 shown in FIG. 1.
FIG. 3 is a schematic diagram of an IDF table provided in the present disclosure.

Refer to FIG. 2, which is a detailed flowchart of Step S102 shown in FIG. 1. Step S102 includes the following steps.

At Step S211, the information to be searched is vectorized, to obtain m vectors $t_i$.

In this step, the information to be searched is vectorized. That is, a word-dividing process is performed on the information to be searched using the word-dividing technology, to divide the information to be searched into m words, which may be represented as $t_1$ to $t_m$, in which m and i are both positive integers, and $1 \leq i \leq m$.

At Step S212, each obtained relevant document is vectorized, to obtain n vectors $d_j$ corresponding to each relevant document.

In this step, each relevant document of all the obtained relevant documents is vectorized. That is, a word-dividing process is performed on each relevant document using the word-dividing technology, to divide the relevant document into n words, which may be represented as $d_1$ to $d_n$, in which n and j are both positive integers, and $1 \leq j \leq n$.

It is to be noted that there is no temporal order between Steps S211 and S212. For example, it is also possible that Step S212 is performed first, and then Step S211 is performed. The vectorizing processing in Steps S211 and S212 may refer to that in the prior art, and will not be described here to avoid redundancy.

At S213, a relevancy score $S_1$ of each relevant document to the information to be searched is calculated based on the word matching algorithm.

In this step, the formula of the word matching algorithm may be as follows:

$$S_1 = \sum_{i=1}^{m} \left(\frac{qtf_i}{k_3 + qtf_i}\right) \times \left(\frac{(k_1 + 1) \times tf_i}{k \times \left(1 - b + b\frac{l}{avdl}\right) + tf_i}\right) \log(w_i)$$

in which parameters $k_1$, $k_3$, k and b are adjustment factors which may be used to smooth data. In particular implementations, parameters $k_1$, $k_3$, k and b are constants, the particular value of which may be set by the user depending on the situation or empirical value;

$qtf_i$ is the word frequency of the $i^{th}$ vector $t_i$ in the information to be searched, i.e., the number of times the vector $t_i$ appears in the information to be searched;

$tf_i$ is the word frequency of the vector $t_i$ in the relevant document, i.e., the number of times the vector $t_i$ appears in the corresponding relevant document;

l is the length of the relevant document, the value of which is n according to the vectorizing process result in Step S212;

avdl is the average length of all relevant documents;

$w_i$ is the weight of the vector $t_i$, which is generally an IDF (inverse document frequency) value and may be calculated by the following formula:

$$w_i = \log\frac{H - htf_i - 0.5}{htf_i + 0.5}$$

in which H is the number of all relevant documents, and $htf_i$ is the word frequency of the vector $t_i$ in all the obtained relevant documents.

In the embodiment of the present disclosure, the weights (the IDF values) of the individual vectors (words) in the network may be calculated in advance and stored, before the search process is performed. For example, the weights of the individual vectors may be stored in the form of a table. Refer to FIG. 3 in combination, which is a schematic diagram of an IDF table provided in the present disclosure. The weights of the individual vectors are stored in the IDF table shown in the example in FIG. 3. It should be understood that the IDF table and the items shown in FIG. 3 are only examples.

At Step S213, the weights of the individual vectors in the information to be searched may be read directly from the preset IDF table. The individual parameters necessary for the word matching algorithm are calculated based on the data obtained in Steps S211 and S212, and are substituted into the calculation formula of the word matching algorithm described above, to obtain the relevancy score $S_1$ of the relevant document to the information to be searched.

At Step S214, a relevancy score $S_2$ of each relevant document to the information to be searched is calculated based on the semantic matching algorithm.

In this step, the formula of the semantic matching algorithm may be as follows:

$$S_2 = \sum_{i=1}^{m} \sum_{j}^{n} \frac{1}{k_3 + 1} \times \left( \frac{k_1 + 1}{k \times \left(1 - b + b\frac{l}{avdl}\right)} \right) mi(t_i, d_j)$$

in which $k_1$, $k_3$, k and b are adjustment factors which may be used to smooth data. In particular implementations, parameters $k_1$, $k_3$, k and b are constants, the particular value of which may be set by the user depending on the situation or empirical value;

l is the length of a corresponding relevant document, the value of which is n according to the vectorizing process result in Step S212;

avdl is the average length of all the obtained relevant documents;

$mi(t_i, d_j)$ is the mutual information between the vector $t_i$ and the vector $d_j$.

In practical applications, the calculation formula of the mutual information between the vector $t_i$ and the vector $d_j$ may be as follows:

$$mi(t_i, d_j) = \log \frac{p(t_i, d_j)}{p(t_i)p(d_j)}$$

in which $$p(t_i, d_j) = \frac{c(t_i, d_j)}{\sum_{t_i, d_j} c(t_i, d_j)},$$

$c(t_i, d_j)$ represents the number of times the vector $t_i$ and the vector $d_j$ appear in the same document at the same time in the network;

$$p(t_i) = \frac{c(t_i)}{\sum_{t_i} c(t_i)},$$

$c(t_i)$ represents the number of times the vector $t_i$ appears in the network;

$$p(d_j) = \frac{c(d_j)}{\sum_{d_j} c(d_j)},$$

$c(d_j)$ represents the number of times the vector $d_j$ appears in the network.

Figures 4, 5:
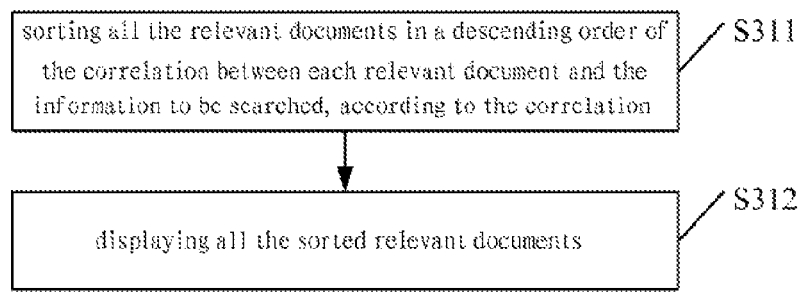
FIG. 4 is a schematic diagram of an MI table provided in the present disclosure.
FIG. 5 is a detailed flowchart of Step S103 shown in FIG. 1.

In the embodiment of the present disclosure, the mutual information between the individual vectors (words) in the network may be calculated in advance and stored, before the search process is performed. For example, the mutual information between the individual vectors may be stored in the form of a table. Refer to FIG. 4 in combination, which is a schematic diagram of an MI table provided in the present disclosure. The mutual information between the individual vectors is stored in the MI table shown in the example of FIG. 4. It should be understood that the MI table and the items shown in FIG. 4 are only examples.

At Step S214, the mutual information between the individual vectors in the information to be searched and the individual vectors in the relevant document may be read directly from the preset MI table. The individual parameters necessary for the semantic matching algorithm are calculated based on the data obtained in Steps S211 and S212, and are substituted into the calculation formula of the semantic matching algorithm described above, to obtain the relevancy score $S_2$ of the relevant document to the information to be searched.

It is to be noted that there is no temporal order between Steps S213 and S214. For example, it is also possible that Step S214 is performed first, and then Step S213 is performed.

At Step S215, the correlation S between each relevant document and the information to be searched is calculated, according to the formula of $S=\alpha \times S_1+(1-\alpha) \times S_2$.

$\alpha$ is a preset weight, and $0<\alpha<1$. In practical applications, the value of $\alpha$ may be set depending on the situation, so that the correlation score S formed of the weighted $S_1$ and $S_2$ can reflect the relevancy degree of the relevant document to the information to be searched more accurately. It is to be noted that the larger the value of S, the higher the relevancy degree of the relevant document to the information to be searched.

Refer to FIG. 5, which is a detailed flowchart of Step S103 shown in FIG. 1. Step S103 includes the following steps.

At Step S311, all the relevant documents are sorted in descending order of the correlation between each relevant document and the information to be searched, according to the correlation.

At Step S312, all the sorted relevant documents are displayed.

After the sorting process of Step S311, the relevant documents are ordered in descending order of correlation, and then displayed in Step S312, so that the user may obtain the relevant document with a higher correlation quickly from the displayed search result, thus meeting the user's search requirement and improving the search efficiency.

Hereinafter, the search method of the examples shown in FIGS. 1-5 will be illustrated in detail in combination with a particular instance.

Assume that the user wants to query some introduction information on a phone with a brand of XX. The user may input the information to be searched as "cost performance ratio of XX brand phone" in a search engine. After the search at Step S101, three relevant documents in total are obtained, including the following.

Relevant Document 1: the cost performance ratios of the XX brand phones are all quite fine indeed, and the XX brand mobile phone is very durable indeed.

Relevant Document 2: I am a loyal user of the XX brand phone. I love to use the XX brand phone, to update version, to download programs, or to play games etc. I think the XX brand phone has much software in various aspects, so I use it until now.

Relevant Document 3: there are many types of phones meeting your requirement, to name a few for your reference: 1. the business bar phone A with a 2.4 inch full keyboard, a metal casing, 5 million pixels, WiFi, and a full support of a navigation system; 2. the popular amusement full-touch phone B with a 3.2 inch screen of 16 million colors, a support of WiFi, 3.2 million pixels, and a support of a navigation system as well as a vehicle holder; 3. the traditional bar phone C with the same function as phone B, but thinner, lighter, 2.2 inch screen, 5 million pixels.

At Step S211, the information to be searched is vectorized to obtain m vectors $t_i$ that are in particular as follows: XX brand\phone\cost performance ratio, in which m=3, $t_1$ is "XX brand", $t_2$ is "phone" and $t_3$ is "cost performance ratio".

At Step S212, any one relevant document is vectorized. Taking Relevant Document 1 as an example, after the vectorizing process at Step S212, n vectors $d_j$ are obtained which are in particular as follows: XX brand\of\phone\cost performance ratio\all\quite\fine\indeed\, \and\XX brand\phone\very\durable\indeed. n=15, $d_1$ is "XX brand", $d_2$ is "of", $d_3$ is "phone", $d_4$ is "cost performance ratio", $d_5$ is "all", $d_6$ is "quite", $d_7$ is "fine", $d_8$ is "indeed", $d_9$ is ",", $d_{10}$ is "and", $d_{11}$ is "XX brand", $d_{12}$ is "phone", $d_{13}$ is "very", $d_{14}$ is "durable", and $d_{15}$ is "indeed".

At Step S213, the word frequency $qtf_i$ of the vector $t_i$ in the information to be searched is counted to obtain 1 for $t_1$, 1 for $t_2$, and 1 for $t_3$, respectively. The word frequency $tf_i$ of the vector $t_i$ in the relevant document is 2 for $t_1$, 2 for $t_2$, and 1 for $t_3$, respectively. The length l of Relevant Document 1 is 15. avdl is the average length of the three relevant documents. It may be read from the preset IDF table shown in FIG. 3 that the weights of the individual vectors in the information to be searched are as follows. $w_1$ is 8.435292, $w_2$ is 5.256969 and $w_3$ is 8.952069. The relevancy score $S_1$ of the relevant document to the information to be searched is calculated based on the calculation formula of the word matching algorithm.

At Step S214, the mutual information between the individual vectors in the information to be searched and the individual vectors in the relevant document may be read from the preset MI table shown in FIG. 4. The relevancy score $S_2$ of the relevant document to the information to be searched is calculated based on the calculation formula of the semantic matching algorithm.

At Step S215, α may be set as needed. For example, α is 0.4, so that $S_1$ and $S_2$ are weighted summed using α, and the correlation S between Relevant Document 1 and the information to be searched is calculated to be 1.759.

Repeating the above steps S211-S215, it is calculated that the correlation S between Relevant Document 2 and the information to be searched is 4.509, and the correlation S between Relevant Document 3 and the information to be searched is 10.403.

At Step S311, Relevant Documents 1-3 are sorted in descending order of correlation, to form a sequence of "Relevant Document 3-Relevant Document 2-Relevant Document 1". At Step S312, the sequence obtained at Step S311 is displayed to the user.

With the processing of the steps as described above, the user may obtain the most related Relevant Document 3 from the top of the displayed search result, and may meet the user's practical search requirement without a further check, thereby improving the search efficiency.

The embodiments of the present disclosure combine the word matching algorithm and the semantic matching algorithm with each other, considering both the matching between words and the matching of the semantic relationship between words comprehensively, obtain a relatively accurate correlation between each relevant document and the information to be searched, sort based on the correlation and display the sorting result. The user may be provided with an ideal search result by obtaining the relevant document with a higher correlation quickly from the displayed search result, thereby meeting the user's practical search requirement, improving the search efficiency and the user's satisfaction.

Corresponding to the search method described above in any one embodiment with reference to FIGS. 1-5, the search devices provided in the embodiments of the present disclosure will be described in detail hereinafter with reference to FIGS. 6-7. The devices of the following embodiments may be applied to the above method embodiments.

Figure 6:
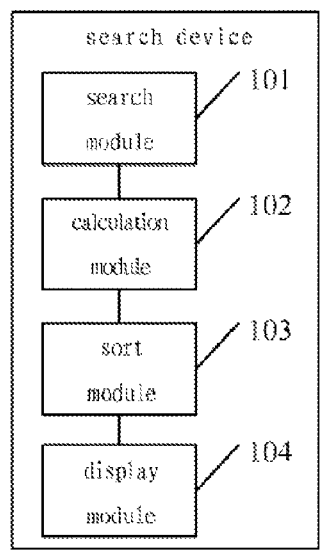
FIG. 6 is a structural schematic diagram of a search device provided in an embodiment of the present disclosure.

Refer to FIG. 6, which is a structural schematic diagram of a search device provided in an embodiment of the present disclosure. The device includes the following modules.

A search module 101 is configured to obtain relevant documents of information to be searched. The detailed search process of the search module 101 may refer to that in the prior art, and will not be described here to avoid redundancy.

A calculation module 102 is configured to calculate a correlation between each relevant document obtained by the search module 101 and the information to be searched, based on a word matching algorithm and a semantic matching algorithm.

In the present embodiment, the score of the correlation between each relevant document and the information to be searched may be formed of two parts, one of which is a relevancy score obtained based on the word matching algorithm, and the other of which is a relevancy score obtained based on the semantic matching algorithm. In practical applications, the weights of the two parts of relevancy scores may be set in advance according to the situation, so that the correlation score formed of the weighted two parts of relevancy scores may reflect the relevancy degree of the relevant document to the information to be searched more accurately.

A sort module 103 is configured to sort the relevant documents obtained by the search module 101 according to the correlation calculated by the calculation module 102.

The sort module 103 may sort all the searched relevant documents in descending order of the correlation score between each relevant document and the information to be searched, which is obtained through calculation by the calculation module 102. Alternatively, the sorting processing may be carried out in other orders, for example, in ascending order of the correlation score. Alternatively, it may be set that some of the documents are in ascending order of the correlation score, and some are in descending order of the correlation score, and so on.

A display module 104 is configured to display a sorting result obtained by the sort module 103.

The display module 104 displays the sorting result obtained by the sort module 103, so that the relevant document most relevant to the information to be searched is displayed first, thereby the user may obtain the relevant document with a higher correlation quickly from the displayed search result, thus meeting the user's search requirement and improving the search efficiency.

Figure 7:
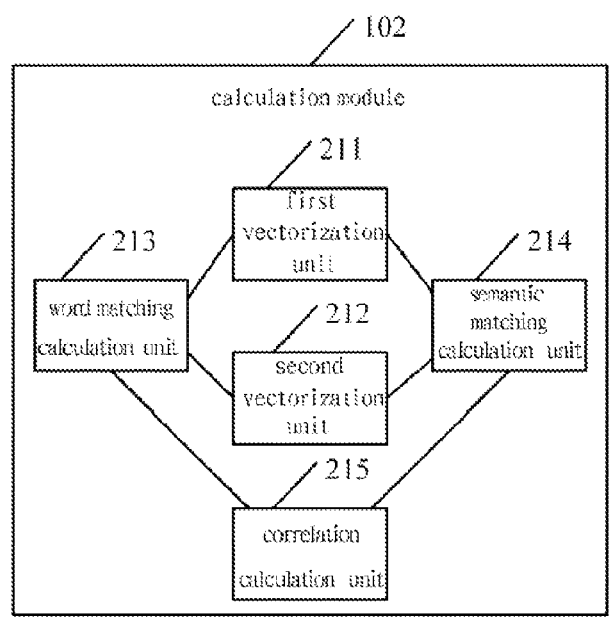
FIG. 7 is a structural schematic diagram of a calculation module in the embodiment shown in FIG. 6.

Refer to FIG. 7, which is a structural schematic diagram of the calculation module in the embodiment shown in FIG. 6. The calculation module 102 includes the following units.

A first vectorization unit 211 is configured to vectorize the information to be searched, to obtain m vectors $t_i$.

The first vectorization unit 211 vectorizes the information to be searched. That is, a word-dividing processing is performed on the information to be searched using the word-dividing technology, to divide the information to be searched into m words, which may be represented as $t_1$ to $t_m$, in which m and i are both positive integers, and $1 \leq i \leq 1$. The detailed process of the first vectorization unit 211 may refer to that in the prior art, and will not be described here to avoid redundancy.

A second vectorization unit 212 is configured to vectorize each relevant document obtained by the search module to obtain n vectors $d_j$ corresponding to each relevant document.

The second vectorization unit 212 vectorizes the relevant document. That is, a word-dividing processing is performed on the relevant document using the word-dividing technology to divide the relevant document into n words, which may be represented as $d_1$ to $d_n$, in which n and j are both positive integers, and $1 \leq j \leq n$. The detailed process of the second vectorization unit 212 may refer to that in the prior art, and will not be described here to avoid redundancy.

A word matching calculation unit 213 is configured to calculate a relevancy score $S_1$ of the relevant document processed by the second vectorization unit 212 to the information to be searched based on the word matching algorithm.

The word matching calculation unit 213 may read the weights of the individual vectors in the information to be searched directly from the preset IDF table shown in FIG. 3, calculate the individual parameters necessary for the word matching algorithm based on the data obtained by the first vectorization unit 211 and the second vectorization unit 212, and calculate the relevancy score $S_1$ of the relevant document to the information to be searched based on the calculation formula of the word matching algorithm.

A semantic matching calculation unit 214 is configured to calculate a relevancy score $S_2$ of the relevant document processed by the second vectorization unit 212 to the information to be searched based on the semantic matching algorithm.

The semantic matching calculation unit 214 may read the mutual information between the individual vectors in the information to be searched and the individual vectors in the relevant document directly from the preset MI table shown in FIG. 4, calculate the individual parameters necessary for the semantic matching algorithm based on the data obtained by the first vectorization unit 211 and the second vectorization unit 212, and calculate the relevancy score $S_2$ of the relevant document to the information to be searched based on the calculation formula of the semantic matching algorithm.

A correlation calculation unit 215 is configured to calculate the correlation S between the relevant document and the information to be searched, according to the formula of $S = \alpha \times S_1 + (1-\alpha) \times S_2$.

$\alpha$ is a preset weight, and $0 < \alpha < 1$. In practical applications, the value of $\alpha$ may be set depending on the situation, so that the correlation score S formed of the weighted $S_1$ and $S_2$ can reflect the relevancy degree of the relevant document to the information to be searched more accurately. It is to be noted that the larger the value of S, the higher the relevancy degree of the relevant document to the information to be searched.

It can be understood that the second vectorization unit 212, the word matching calculation unit 213, the semantic matching calculation unit 214 and the correlation calculation unit 215 may need to work repeatedly, until the correlations between all the relevant documents and the information to be searched are obtained. Then, the sort module 103 may sort all the relevant documents obtained by the search module in descending order of correlation between each relevant document and the information to be searched. The display module 104 displays all the relevant documents sorted by the sort module 103.

It is to be noted that the search device described in the embodiments of the present disclosure may be a search engine, a browser or a terminal with search function.

Through the description of the above embodiments, the embodiments of the present disclosure combine the word matching algorithm and the semantic matching algorithm with each other, considering both the matching between words and the matching of the semantic relationship between words comprehensively, obtain a relatively accurate correlation between each relevant document and the information to be searched, sort based on the correlation and display the sorting result. The user may be provided with an ideal search result by obtaining the relevant document with a higher correlation quickly from the displayed search result, thereby meeting the user's practical search requirement, improving the search efficiency and the user's satisfaction.

It can be understood by those ordinary skilled in the art that all or part of flow for implementing the above embodiments may be completed by the related hardware instructed by a computer program which may be stored in a computer readable storage medium which may be a magnetic disk, an optical disk, a ROM (Read Only Memory), a RAM (Random Access Memory) or the like. The program, when executed, may perform the flow of the embodiments of the methods described above.

The described above are only preferable embodiments of the present disclosure and are not intended to limit the present disclosure. Those ordinary skilled in the art may understand that all or part of the flow for implementing the above embodiments, as well as change equivalents made based on the claims of the present disclosure, shall all be contained within the protection scope of the present disclosure.

What is claimed is:

1. A search method, comprising:
   obtaining relevant documents of information to be searched;
   calculating a correlation between each obtained relevant document and the information to be searched, based on a word matching algorithm and a semantic matching algorithm; and
   sorting the obtained relevant documents according to the calculated correlation, and displaying a sorting result;
   wherein said calculating a correlation between each obtained relevant document and the information to be searched based on a word matching algorithm and a semantic matching algorithm comprises:
   vectorizing the information to be searched, to obtain m vectors $t_i$, wherein m and i are both positive integers, and $1 \leq i \leq m$;
   vectorizing each obtained relevant document, to obtain n vectors $d_j$ corresponding to each relevant document, wherein n and j are both positive integers, and $1 \leq j \leq n$;

calculating a relevancy score $S_1$ of each relevant document to the information to be searched based on the word matching algorithm, and calculating a relevancy score $S_2$ of each relevant document to the information to be searched based on the semantic matching algorithm;

calculating the correlation S between each relevant document and the information to be searched, according to the formula of $S=\alpha \times S_1+(1-\alpha) \times S_2$, wherein $\alpha$ is a preset weight, and $0<\alpha<1$;

wherein the formula of the word matching algorithm is as follows:

$$S_1 = \sum_{i=1}^{m} \left(\frac{qtf_i}{k_3 + qtf_i}\right) \times \left(\frac{(k_1 + 1) \times tf_i}{k \times \left(1 - b + b\frac{l}{avdl}\right) + tf_i}\right) \log(w_i)$$

wherein $k_1$, $k_3$, k and b are constants, $qtf_i$ is the word frequency of the $i^{th}$ vector $t_i$ in the information to be searched, $tf_i$ is the word frequency of the vector $t_i$ in a corresponding relevant document, l is the length of the corresponding relevant document, avdl is the average length of all obtained relevant documents, and $w_i$ is the weight of the vector $t_i$.

2. The method according to claim 1, wherein the calculation formula of the weight of the vector $t_i$ is as follows:

$$w_i = \log \frac{H - htf_i - 0.5}{htf_i + 0.5}$$

wherein H is the number of all obtained relevant documents, and $htf_i$ is the word frequency of the vector $t_i$ in all the relevant documents.

3. The method according to any one of claims 1, wherein said sorting the obtained relevant documents according to the calculated correlation and displaying a sorting result comprises:

sorting all the relevant documents in a descending order of the correlation between each relevant document and the information to be searched, according to the correlation; and displaying all the sorted relevant documents.

4. A search method, comprising:

obtaining relevant documents of information to be searched;

calculating a correlation between each obtained relevant document and the information to be searched, based on a word matching algorithm and a semantic matching algorithm; and sorting the obtained relevant documents according to the calculated correlation, and displaying a sorting result;

wherein said calculating a correlation between each obtained relevant document and the information to be searched based on a word matching algorithm and a semantic matching algorithm comprises:

vectorizing the information to be searched, to obtain m vectors $t_i$, wherein m and i are both positive integers, and $1 \leq i \leq m$;

vectorizing each obtained relevant document, to obtain n vectors $d_j$ corresponding to each relevant document, wherein n and j are both positive integers, and $1 \leq j \leq n$;

calculating a relevancy score $S_1$ of each relevant document to the information to be searched based on the word matching algorithm, and calculating a relevancy score $S_2$ of each relevant document to the information to be searched based on the semantic matching algorithm;

calculating the correlation S between each relevant document and the information to be searched, according to the formula of $S=\alpha \times S_1+(1-\alpha) \times S_2$, wherein $\alpha$ is a preset weight, and $0<\alpha<1$;

wherein the formula of the semantic matching algorithm is as follows:

$$S_2 = \sum_{i=1}^{m} \sum_{j}^{n} \frac{1}{k_3 + 1} \times \left(\frac{k_1 + 1}{k \times \left(1 - b + b\frac{l}{avdl}\right)}\right) mi(t_i, d_j)$$

wherein $k_1$, $k_3$, k and b are constants, l is the length of a corresponding relevant document, avdl is the average length of all the obtained relevant documents, and $mi(t_i, d_j)$ is the mutual information between the vector $t_i$ and the vector $d_j$.

5. The method according to claim 4, wherein the calculation formula of the mutual information between the vector $t_i$ and the vector $d_j$ is as follows:

$$mi(t_i, d_j) = \log \frac{p(t_i, d_j)}{p(t_i)p(d_j)}$$

wherein $$p(t_i, d_j) = \frac{c(t_i, d_j)}{\sum_{t_i d_j} c(t_i, d_j)},$$

$c(t_i,d_j)$ represents the number of times the vector $t_i$ and the vector $d_j$ appear in the same document at the same time in network;

$$p(t_i) = \frac{c(t_i)}{\sum_{t_i} c(t_i)},$$

$c(t_i)$ represents the number of times the vector $t_i$ appears in the network;

$$p(d_j) = \frac{c(d_j)}{\sum_{d_j} c(d_j)},$$

$c(d_j)$ represents the number of times the vector $d_j$ appears in the network.

6. A search device, comprising:

a search module which is configured to obtain relevant documents of information to be searched;

a calculation module which is configured to calculate a correlation between each relevant document obtained by the search module and the information to be searched, based on a word matching algorithm and a semantic matching algorithm;

a sort module which is configured to sort the relevant documents obtained by the search module according to the correlation calculated by the calculation module; and a display module which is configured to display a sorting result obtained by the sort module;

wherein the calculation module comprises:

a first vectorization unit which is configured to vectorize the information to be searched, to obtain m vectors $t_i$, wherein m and i are both positive integers, and $1 \leq i \leq m$;

a second vectorization unit which is configured to vectorize each relevant document obtained by the search module, to obtain n vectors $d_j$ corresponding to each relevant document, wherein n and j are both positive integers, and $1 \le j \le n$;

a word matching calculation unit which is configured to calculate a relevancy score $S_1$ of the relevant document processed by the second vectorization unit to the information to be searched based on the word matching algorithm;

a semantic matching calculation unit which is configured to calculate a relevancy score $S_2$ of the relevant document processed by the second vectorization unit to the information to be searched based on the semantic matching algorithm; and a correlation calculation unit which is configured to calculate the correlation S between the relevant document and the information to be searched, according to the formula of $S = \alpha \times S_1 + (1-\alpha) \times S_2$, wherein $\alpha$ is a preset weight, and $0 < \alpha < 1$;

wherein the formula of the word matching algorithm is:

$$S_1 = \sum_{i=1}^{m} \left(\frac{qtf_i}{k_3 + qtf_i}\right) \times \left(\frac{(k_1+1) \times tf_i}{k \times \left(1 - b + b\frac{l}{avdl}\right) + tf_i}\right) \log(w_i)$$

the formula of the semantic matching algorithm is as follows:

$$S_2 = \sum_{i=1}^{m} \sum_{j}^{n} \frac{1}{k_3 + 1} \times \left(\frac{k_1 + 1}{k \times \left(1 - b + b\frac{l}{avdl}\right)}\right) mi(t_i, d_j)$$

wherein $k_1$, $k_3$, k and b are constants, $qtf_i$ is the word frequency of the $i^{th}$ vector $t_i$ in the information to be searched, $tf_i$ is the word frequency of the vector $t_i$ in a corresponding relevant document, l is the length of the corresponding relevant document, avdl is the average length of all relevant documents obtained by the search module, $w_i$ is the weight of the vector $t_i$, and $mi(t_i,d_j)$ is the mutual information between the vector $t_i$ and the vector $d_j$.

7. The device according to claim 6, wherein the sort module is configured to sort all the relevant documents obtained by the search module in a descending order of the correlation between each relevant document and the information to be searched, according to the correlation; and the display module is configured to display all the relevant documents sorted by the sort module.

* * * * *